United States Patent
Chew et al.

(10) Patent No.: US 9,000,703 B2
(45) Date of Patent: Apr. 7, 2015

(54) BACK EMF DETECTION IN A BRUSHLESS DC MOTOR USING A VIRTUAL CENTER TAP CIRCUIT

(71) Applicant: STMicroelectronics Asia Pacific Pte. Ltd., Singapore (SG)

(72) Inventors: Wei Seng Chew, Singapore (SG); Kaufik Linggajaya, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 192 days.

(21) Appl. No.: 13/687,193

(22) Filed: Nov. 28, 2012

(65) Prior Publication Data
US 2014/0145661 A1    May 29, 2014

(51) Int. Cl.
*H02P 6/18* (2006.01)
(52) U.S. Cl.
CPC ........................................ *H02P 6/182* (2013.01)
(58) Field of Classification Search
USPC .............. 318/400.32, 400.34, 400.35, 400.36
See application file for complete search history.

(56) References Cited

U.S. PATENT DOCUMENTS

| | | | | |
|---|---|---|---|---|
| 3,624,471 A | * | 11/1971 | Japp et al. | 318/771 |
| 5,017,845 A | * | 5/1991 | Carobolante et al. | 318/400.11 |
| 5,023,527 A | * | 6/1991 | Erdman et al. | 318/400.34 |
| 5,227,709 A | * | 7/1993 | Gauthier et al. | 318/685 |
| 5,233,275 A | * | 8/1993 | Danino | 318/400.35 |
| 5,530,326 A | * | 6/1996 | Galvin et al. | 318/400.11 |
| 5,640,073 A | * | 6/1997 | Ikeda et al. | 318/400.03 |
| 6,633,145 B2 | | 10/2003 | Shao et al. | |
| 7,102,307 B2 | | 9/2006 | Shao | |
| 7,301,298 B2 | | 11/2007 | Shao et al. | |

* cited by examiner

*Primary Examiner* — Bentsu Ro
(74) *Attorney, Agent, or Firm* — Gardere Wynne Sewell LLP

(57) ABSTRACT

A first input of a differential circuit is coupled to a coil tap for a first phase of a multi-phase brushless DC motor. The first phase is associated with an electrically floating coil. A second input of the differential circuit is coupled to a virtual center tap. A divider circuit is coupled between coil taps for other phases of the multi-phase brushless DC motor to define a virtual center tap. The other phases are phases actuated for motor operation when the first phase is electrically floating. The coil tap for the first phase is electrically isolated from the virtual center tap. The differential circuit performs a comparison of the voltage at the coil tap for the first phase to the voltage at the virtual center tap to generate a back EMF signal.

20 Claims, 4 Drawing Sheets

BACK EMF DETECTION IN A BRUSHLESS DC MOTOR USING A VIRTUAL CENTER TAP CIRCUIT

TECHNICAL FIELD

The present invention relates to brushless DC (BLDC) motors and, in particular, to back EMF detection with respect to such motors.

BACKGROUND

FIG. 1 shows the typical inverter configuration and current commutation sequence for a brushless sensorless DC (BLDC) motor. Generally, a brushless DC motor is driven by three phase inverter (motor drive circuit) by applying three voltage profiles on the three phase that will result in each phase current profile being three sine wave each 120° electrical angle phase apart from each other. In an ideal motor, the Bemf in each phase will track the phase of its current. The zero crossing of this Bemf signal can be measured by first anticipating when the zero crossing is about to occur, and then opening a "window" by floating the motor phase corresponding to the zero cross to make a back EMF detection measurement in the floating winding.

FIG. 2 illustrates a conventional back EMF detection circuit 10 for a floating winding measurement. The circuit 10 includes a differential amplifier 12 having a first (negative) input terminal coupled to the center tap CT of the motor 14. The differential amplifier 12 further includes a second (positive) input terminal coupled to the coil tap of motor phase C. The assumption here is that the measurement is made with respect to motor phase C presenting the floating third phase. The following equation applies:

$$Vc-Vct=BemfC+(Rm \times Ic)+(L \times dIc/dt)$$

If motor phase C is the floating third phase (i.e., the commutation phase sequence is at AB), and if the differential amplifier 12 has a high input impedance, the current flowing through motor phase C is Ic=0. The foregoing equation thus simplifies to:

$$BemfC=Vc-Vct$$

As is known to those skilled in the art, a BLDC motor in many instances does not include an externally accessible center tap CT connection. The implementation of FIG. 2 therefore cannot be used for measuring back EMF.

FIG. 3 illustrates a conventional back EMF detection circuit 20 using a three phase virtual center tap measurement configuration. Again, the floating third phase opens a window to make a back EMF detection measurement in the floating winding. The circuit 20 includes a differential amplifier 22 having a first (negative) input terminal coupled to a three phase virtual center tap VCT of the motor 24. A first sense resistor Rs is coupled between the coil tap of motor phase C and the three phase virtual center tap VCT. A second sense resistor Rs is coupled between the coil tap of motor phase B and the three phase virtual center tap VCT. A third sense resistor Rs is coupled between the coil tap of motor phase A and the three phase virtual center tap VCT. It will accordingly be understood that the phrase "three phase virtual center tap" refers to and means a virtual center tap circuit coupled to three motor phases. The differential amplifier 12 further includes a second (positive) input terminal coupled to the coil tap of motor phase C (the floating phase). The assumption here is that the measurement is made with respect to motor phase C presenting the floating third phase. The following equations apply:

$$Vvct=(Va+Vb+Vc)/3$$

$$Vvct=(BemfA+BemfB+BemfC+Rm(Ia+Ib+Ic))/3+Vct$$

$$Vc-Vvct=\tfrac{2}{3}(BemfC+Rm \times Ic)-\tfrac{1}{3}(BemfA+BemfB+Rm(Ia+Ib))$$

$$Vc-Vvct=BemfC+Rm/3(2Ic-Ia-Ib)$$

$$Vc-Vvct=BemfC+Rm/3(3Ic)$$

$$Vc-Vvct=BemfC+Rm \times Ic$$

Because the comparator is usually designed with high input impedance, the current Ic in the floating phase can theoretically be ignored and the foregoing equations simplify to:

$$BemfC=Vc-Vvct$$

More generally, let Iext be the current sourced from Vc from external devices (e.g., the comparator input or spindle driver leakage, etc.). Applying Kirchhoff's current law on the node for the coil tap of motor phase C, the following equations apply:

$$Ic=(Vb+Va-2Vvct)/(2Rs)-Iext$$

$$Ic=(Vb+Va-\tfrac{2}{3}(Va+Vb+Vc))/Rs-Iext$$

$$Ic=-BemfC/(Rs+Rm)-Rs/(Rs+Rm)Iext$$

$$Vc-Vvct=Rs/(Rs+Rm)BemfC-RmRs/(Rs+Rm)Iext$$

The resistance Rs is generally chosen such that Rs>>Rm and Iext is approximately zero. The foregoing thus reduces to:

$$BemfC=Vc-Vvct$$

SUMMARY

In an embodiment, a circuit comprises: a differential circuit having a first input coupled to a coil tap for a first phase of a three phase brushless DC motor and an output configured to generate a back EMF signal; a divider circuit coupled between coil taps for a second phase and a third phase of said three phase brushless DC motor to define a two phase virtual center tap; said differential circuit further having a second input coupled to said two phase virtual center tap.

In an embodiment, a method comprises: first sensing a voltage at a coil tap for a first phase of a three phase brushless DC motor, said first sensing being performed when said first phase is electrically floating; second sensing a two phase virtual center tap voltage between a second phase and a third phase of said three phase brushless DC motor, said second sensing being performed when said second and third phases are electrically driving; and performing a comparison of said voltage to said two phase virtual center tap voltage to generate a back EMF signal.

In an embodiment, a circuit comprises: a differential circuit having a first input coupled to a coil tap for one phase of an n phase brushless DC motor and an output configured to generate a back EMF signal; a divider circuit coupled between coil taps for less than n other phases of said n phase brushless DC motor to define a <n phase virtual center tap; said differential circuit further having a second input coupled to said <n phase virtual center tap; wherein n is greater than or equal to three.

In an embodiment, a circuit comprises: a differential circuit having a first input coupled to a coil tap for a first phase of a multi-phase brushless DC motor, where the first phase is associated with an electrically floating coil, and further having a second input coupled to a virtual center tap. A divider circuit is coupled between coil taps for other phases of the multi-phase brushless DC motor to define the virtual center tap, the other phases being phases actuated for motor operation when the first phase is electrically floating. The coil tap for the first phase is electrically isolated from the virtual center tap. The differential circuit is configured to perform a comparison of the voltage at the coil tap for the first phase to the voltage at the virtual center tap to generate a back EMF signal.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 3:
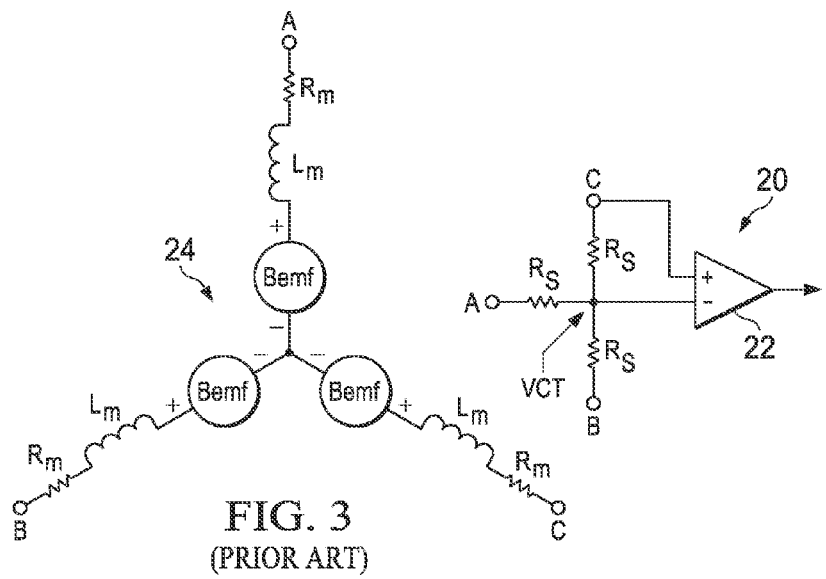
FIG. 3 illustrates a conventional back EMF detection circuit using a three phase virtual center tap measurement configuration.
Figure 4:
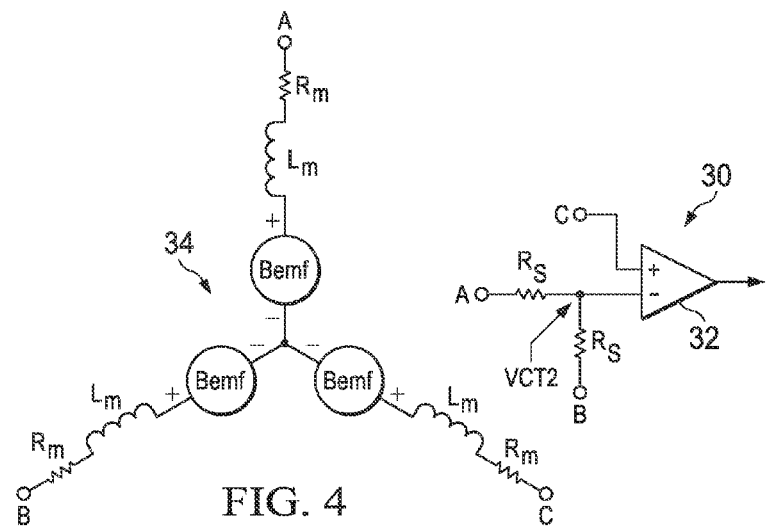
FIG. 4 illustrates a back EMF detection circuit on a single motor phase using a two phase virtual center tap measurement configuration.

Reference is now made to FIG. 4 which illustrates a back EMF detection circuit 30 on a single motor phase using a two phase virtual center tap measurement configuration. Again, the floating third phase opens a window to make a back EMF detection measurement in the floating winding. The circuit 30 includes a differential amplifier 32 having a first (negative) input terminal coupled to a two phase virtual center tap VCT2 of the motor 34. A first sense resistor Rs is coupled between the coil tap of motor phase A and the two phase virtual center tap VCT2. A second sense resistor Rs is coupled between the coil tap of motor phase B and the two phase virtual center tap VCT2. The first and second sense resistors, coupled in series between the coil tap of motor phase A and the coil tap of motor phase B define a resistive divider circuit. It will be noted, in contrast to the circuit of FIG. 3, that the coil tap of motor phase C is isolated from the virtual center tap VCT. It will accordingly be understood that the phrase "two phase virtual center tap" refers to and means a virtual center tap circuit coupled to only two motor phases. The differential amplifier 32 further includes a second (positive) input terminal directly connected to the coil tap of motor phase C (the floating phase). The assumption here is that the measurement is made with respect to motor phase C presenting the floating third phase. The following equations apply:

$$Vvct2=(Va+Vb)/2$$

$$Vvct2=(BemfA+BemfB+Rm(Ia+Ib))/2+Vct$$

$$Vc-Vvct2=(BemfC+Rm \times Ic)-(BemfA+BemfB+Rm(Ia+Ib))/2$$

$$Vc-Vvct2=3/2(BemfC)+3.2(Rm \times Ic)$$

$$Vc-Vvct2=3/2(BemfC)-3/2Rm \times Iext \quad \text{(Eqn. 1)}$$

The absence of sense resistor Rs coupled between the coil tap of motor phase C and the virtual center tap VCT (compare to FIG. 3) ensures that Ic=0 when motor phase C presents the floating third phase. The current Iext is approximately zero. The back EMF signal of the floating phase is advantageously amplified by the circuit by 50%.

Figure 5:
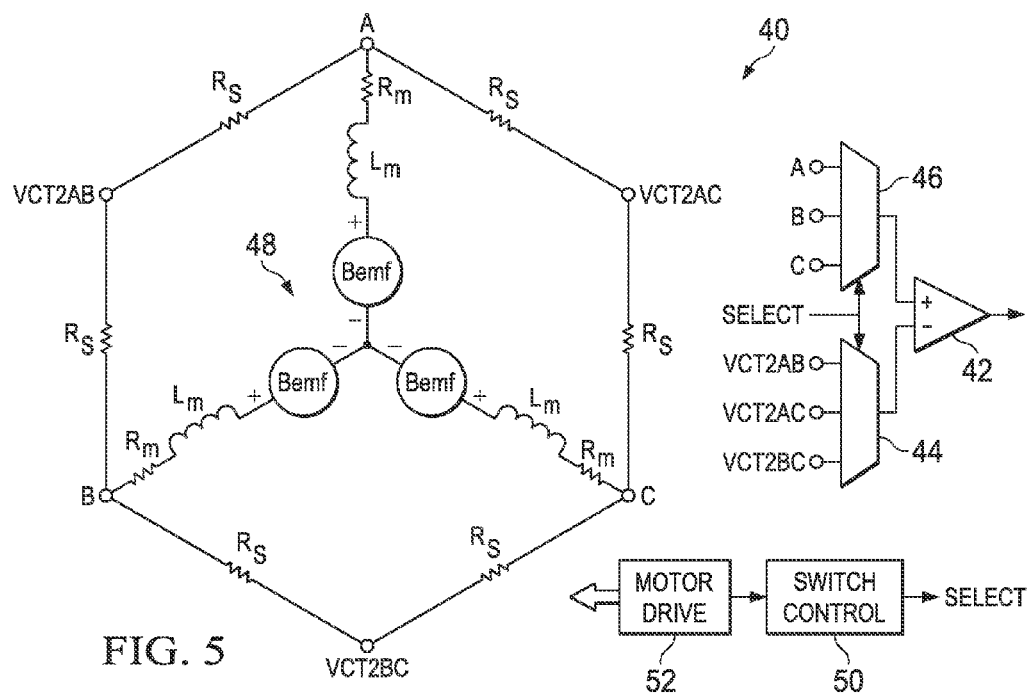
FIG. 5 illustrates a back EMF detection circuit on all motor phases using a selectable two phase virtual center tap measurement configuration.

Reference is now made to FIG. 5 which illustrates a back EMF detection circuit 40 on all motor phases using a selectable two phase virtual center tap measurement configuration. Again, the floating third phase opens a window to make a back EMF detection measurement in the floating winding. The circuit of FIG. 5, however, is configurable to make the measurement on any selected one of the motor phases when it is in a floating condition.

A first sense resistor Rs is coupled between the coil tap of motor phase A and a two phase virtual center tap VCT2AC. A second sense resistor Rs is coupled between the coil tap of motor phase C and the two phase virtual center tap VCT2AC. The first and second sense resistors, coupled in series between the coil tap of motor phase A and the coil tap of motor phase C define a first resistive divider circuit. A third sense resistor Rs is coupled between the coil tap of motor phase A and a two phase virtual center tap VCT2AB. A fourth sense resistor Rs is coupled between the coil tap of motor phase B and the two phase virtual center tap VCT2AB. The third and fourth sense resistors, coupled in series between the coil tap of motor phase A and the coil tap of motor phase B define a second resistive divider circuit. A fifth sense resistor Rs is coupled between the coil tap of motor phase B and a two phase virtual center tap VCT2BC. A sixth sense resistor Rs is coupled between the coil tap of motor phase C and the two phase virtual center tap VCT2BC. The fifth and sixth sense resistors, coupled in series between the coil tap of motor phase B and the coil tap of motor phase C define a third resistive divider circuit.

The circuit 40 includes a differential amplifier 42 having a first (negative) input terminal coupled to an output of a first multiplexer circuit 44. The first multiplexer circuit 44 includes a plurality of inputs corresponding to a number of phases of the motor 48. Each input of the first multiplexer circuit 44 is coupled to a coil tap of one of the motor phases. Thus, a first input of the first multiplexer circuit 44 is coupled to the coil tap of motor phase A, a second input of the first multiplexer circuit 44 is coupled to the coil tap of motor phase B, and a third input of the first multiplexer circuit 44 is coupled to the coil tap of motor phase C. The differential amplifier 42 further includes a second (positive) input terminal coupled to an output of a second multiplexer circuit 44. The second multiplexer circuit 46 includes a plurality of inputs corresponding to a number of phases of the motor 48. Each input of the second multiplexer circuit 46 is coupled to one of the two phase virtual center taps VCT2 associated with each pair of motor phases. Thus, a first input of the second multiplexer circuit 46 is coupled to the two phase virtual center tap VCT2AB between motor phases A and B, a second input of the second multiplexer circuit 46 is coupled to the two phase virtual center tap VCT2AC between motor phases A and C, and a third input of the second multiplexer circuit 46 is coupled to the two phase virtual center tap VCT2BC between motor phases B and C.

The first multiplexer circuit 44 is operable in response to a SELECT signal to select one of the first, second or third inputs to be connected through to the first (negative) input terminal of the differential amplifier 42. The second multiplexer circuit 46 is operable in response to the SELECT signal to select one of the first, second or third inputs to be connected through to the second (positive) input terminal of the differential amplifier 42. It will be understood that the SELECT signal may comprise a multibit control signal and may, if desired, comprise more than one signal (the illustration of a single SELECT signal line being merely matter of illustration convenience).

A control circuit 50 receives input from the motor drive circuit 52 (see, for example, FIG. 1) and is operable to generate the SELECT signal in accordance with the commutation phase sequence of the motor 48 and more particularly in accordance with which one of the motor phases is currently floating. Thus, as an example, when the motor drive circuit 52 specifies a commutation phase sequence of the motor 48 for driving motor phases A and B, and thus motor phase C is floating and available for making a back EMF measurement using circuit 40, the control circuit 50 generates a SELECT signal which will cause the first multiplexer circuit 44 to select the third input (coupled to the coil tap of motor phase C) and further cause the second multiplexer circuit 46 to select the first input (coupled to the two phase virtual center tap VCT2AB between motor phases A and B). A similar operation is performed to generate the SELECT signal in connection with measuring back EMF on the other motor phases.

Consistent with the operation made in accordance with the example SELECT signal above, assume that the back EMF measurement is being made with respect to motor phase C presenting the floating third phase. Using Kirchhoff's current law on the node for the coil tap of motor phase C, the following equations apply:

$$Ic=(Vb+Va-2Vc)/(2Rs)-Iext$$

$$Ic=(BemfB+BemfA-(Ic\times Rm)-2BemfC-2Ic\times Rm)/(2Rs)-Iext$$

$$Ic=-3/(2Rs)\times(BemfC+(Ic\times Rm))-Iext$$

$$Ic=-3/(2Rs+3Rm)\times BemfC-2Rs/(2Rs+3Rm)Iext$$

Assuming Iext is approximately zero, and substituting the above into Eqn. 1, and replacing Vvct2=Vvct2ab gives:

$$Vc-Vvct2ab=3/2(BemfC)-3/2(Rm)\times 3/(2Rs+3Rm)\times BemfC$$

$$Vc-Vvct2ab=3Rs/(2Rs+3Rm)\times BemfC$$

Thus, the voltage across Vc and Vvct2ab is independent of the current Ic. The values of the resistances for resistors Rm and Rs do not affect the offset of the back EMF signal. So, if Rs>>Rm, the foregoing simplifies to:

$$Vc-Vvct2ab\approx 3/2(BemfC)$$

The back EMF signal of the floating phase is accordingly amplified by the circuit by 50%.

Figure 6:
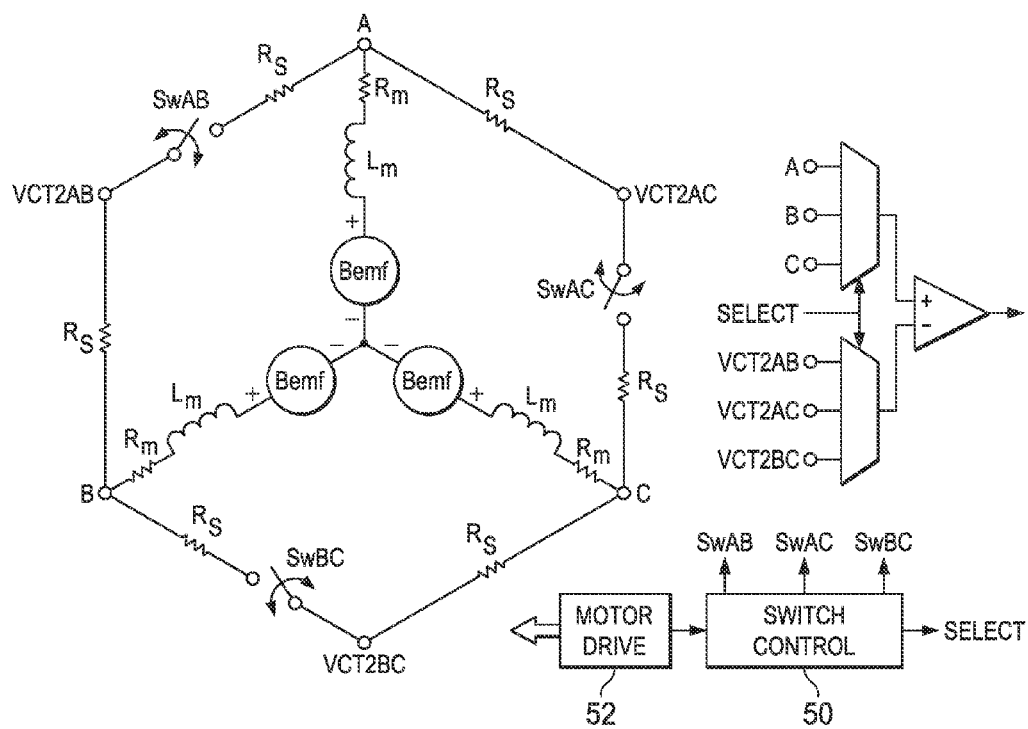
FIG. 6 illustrates a back EMF detection circuit on all motor phases using a selectable two phase virtual center tap measurement configuration.

Reference is now made to FIG. 6 which illustrates a back EMF detection circuit 40' operable on all motor phases using a selectable two phase virtual center tap measurement configuration. The circuit 40' is substantially identical to the circuit 40 of FIG. 5, and like reference numbers refer to identical circuit components and connections. The discussion of FIG. 5 is incorporated herein by reference.

The circuit 40' of FIG. 6 differs from the circuit 40 of FIG. 5 in the configuration of the circuit which defines the two phase virtual center taps. Specifically, a switching element Sw is inserted in the series connection of sense resistors Rs between each set of motor phase coil taps. Thus, the first sense resistor Rs and second sense resistor Rs are coupled in series with a first switching element SwAC between the coil tap of motor phase A and the coil tap of motor phase C. The two phase virtual center tap VCT2AC may be taken at any location in the series circuit, provided it is between the first and second sense resistors. The first switching element SwAC preferably has a very low on resistance and can be placed at any location in the series circuit. The third sense resistor Rs and fourth sense resistor Rs are coupled in series with a second switching element SwAB between the coil tap of motor phase A and the coil tap of motor phase B. The two phase virtual center tap VCT2AB may be taken at any location in the series circuit, provided it is between the third and fourth sense resistors. The second switching element SwAB preferably has a very low on resistance and can be placed at any location in the series circuit. The fifth sense resistor Rs and sixth sense resistor Rs are coupled in series with a third switching element SwBC between the coil tap of motor phase B and the coil tap of motor phase C. The two phase virtual center tap VCT2BC may be taken at any location in the series circuit, provided it is between the fifth and sixth sense resistors. The third switching element SwBC preferably has a very low on resistance and can be placed at any location in the series circuit.

A control circuit 50 receives input from the motor drive circuit 52 and is operable to control actuation of the first, second and third switching elements SwAB, SwAC and SwBC in accordance with the commutation phase sequence of the motor 48 and more particularly in accordance with which one of the motor phases is currently floating. Thus, as an example, when the motor drive circuit 52 specifies a commutation phase sequence of the motor 48 for driving motor phases A and B, and thus motor phase C is floating and available for making a back EMF measurement using circuit 40', the control circuit 50 causes switching element SwAB to be closed and switching elements SwAC and SwBC to be open. The opening of switching elements SwAC and SwBC eliminates current paths (when motor phase C is floating) from the coil tap of motor phase C to either of the coil taps of motor phases A and B through the two phase virtual center taps VCT2AC and VCT2BC. A similar operation is performed to generate the control signals for the first, second and third switching elements SwAB, SwAC and SwBC in connection with measuring back EMF on the other motor phases.

Figure 1:
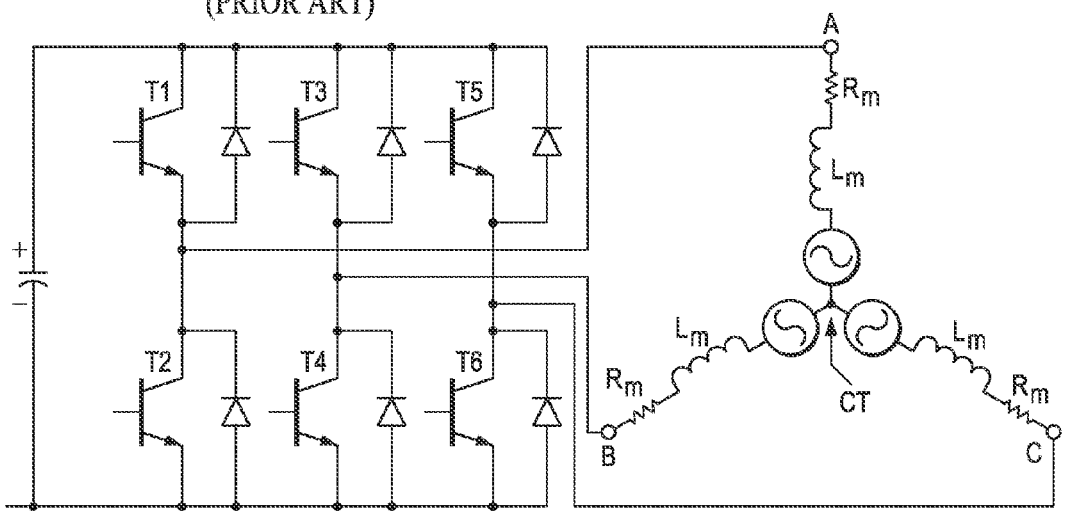
FIG. 1 shows the typical inverter configuration and current commutation sequence for a brushless sensorless DC (BLDC) motor.
Figure 2:
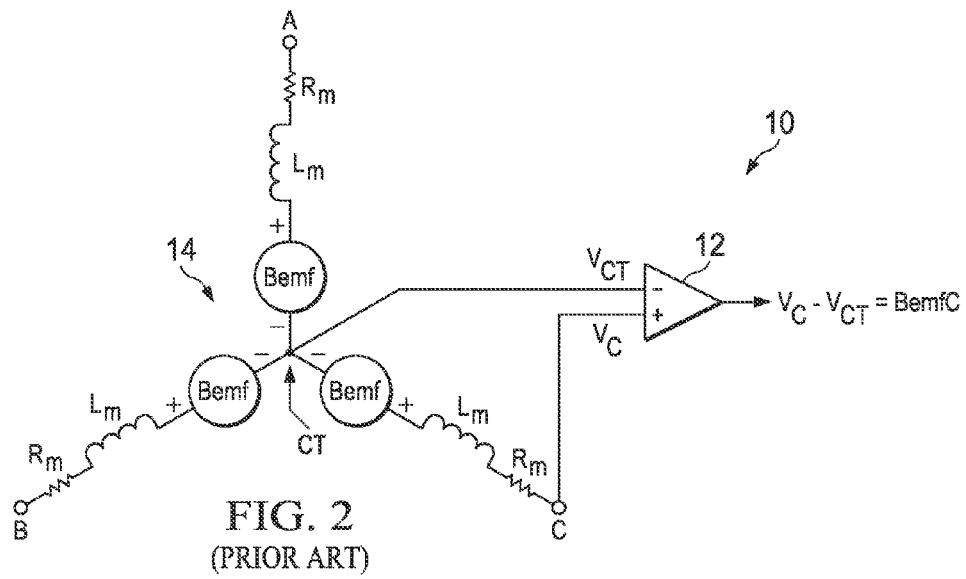
FIG. 2 illustrates a conventional back EMF detection circuit for a floating winding measurement.

Although the motor drive circuit shown in FIG. 1 uses bi-polar transistor devices, it will be understood that other types of transistors, for example, MOSFET devices, could alternatively be used.

The first, second and third switching elements SwAB, SwAC and SwBC may be implemented using transistor devices, such as pass gate devices implemented in MOS or CMOS technology. Although only one switching element is shown in each series circuit path, it will be understood that two switching elements per path, one on either side of the two phase virtual center tap, could instead be provided.

The differential (operational) amplifier circuit configured to operate as a differentiator could alternatively be implemented as a voltage comparator circuit generating a digital output signal.

The switch control circuit 50 is preferably implemented as a digital logic circuit.

The motor drive circuit 52 and control circuit 50 may alternatively be implemented as microcontroller or application specific integrated circuit (ASIC).

Although specific examples with respect to a three phase BLDC motor are described above, it will be understood that the concepts described for virtual center back EMF measurement are equally applicable to BLDC motors having more than three phases. The coil tap of the motor phase which is the floating phase is coupled to the positive input of the differential amplifier. A virtual center tap is defined with respect to the remaining phases which are actuated to drive motor operation, that virtual center tap being coupling to the coil taps of the actuated motor phases through a sense resistor. The coil tap of the motor phase which is the floating phase is electrically isolated from the virtual center tap.

Thus, in a more generic sense, for an n-phase phase BLDC motor, the coil tap of the motor phase which is the floating phase is coupled to the positive input of the differential amplifier, and the <n phases which are activated to drive motor operation have their corresponding motor phase coil taps coupled by a virtual center tap circuit to define a <n phase virtual center tap VCT<n, with the coil tap of the motor phase which is the floating phase being electrically isolated from the <n phase virtual center tap VCT<n. It will accordingly be understood that the phrase "<n phase virtual center tap" refers to and means a virtual center tap circuit coupled to less than n of the motor phases of the n-phase phase BLDC motor.

Advantages: in the circuit implementations, there is amplification on the measured signal by up to 50% which helps to improve the accuracy of the zero crossing detection due to the signal crossings at the inputs of the amplifier/comparator having a higher slope, and the signal amplification also improves the signal to noise ratio and lowers the requirement for having a smaller Rs value to reduce thermal noise in the resistor.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
    a differential circuit having a first input, a second input and an output configured to generate a back EMF signal relating to an n phase brushless DC motor;
    a selection circuit configured to selectively couple a coil tap for one phase of said n phase brushless DC motor to the first input of the differential circuit only when said one phase is electrically floating;
    a divider circuit coupled between coil taps for less than n other phases of said n phase brushless DC motor to define a <n phase virtual center tap, wherein said <n phase virtual center tap is coupled to the second input of the differential circuit;
    wherein n is greater than or equal to three.

2. The circuit of claim 1, wherein said coil tap for the one phase of said n phase brushless DC motor is electrically isolated from said <n phase virtual center tap.

3. The circuit of claim 1, wherein the less than n other phases of said n phase brushless DC motor comprises phases which are actuated to drive operation of the n phase brushless DC motor when said one phase is the electrically floating coil.

4. A circuit, comprising:
    a differential circuit having a first input coupled to a coil tap for a first phase of a three phase brushless DC motor and an output configured to generate a back EMF signal;
    a divider circuit coupled between coil taps for a second phase and a third phase of said three phase brushless DC motor to define a two phase virtual center tap;
    said differential circuit further having a second input coupled to said two phase virtual center tap;
    a selection circuit configured to couple the first input of the differential circuit to the coil tap for the first phase of the three phase brushless DC motor; and
    a control circuit configured control operation of the selection circuit to selectively couple the first input of the differential circuit to the coil tap for the first phase of the three phase brushless DC motor in response to said first phase being an electrically floating coil.

5. The circuit of claim 1, wherein said coil tap for the first phase of said brushless DC motor is electrically isolated from said two phase virtual center tap.

6. The circuit of claim 1, wherein the back EMF signal is representative of a back EMF voltage induced in the electrically floating coil of the three phase brushless DC motor.

7. The circuit of claim 1, wherein said differential circuit is a differential amplifier.

8. The circuit of claim 1, wherein said differential circuit is a comparator.

9. The circuit of claim 1, wherein the first input of the differential circuit is indirectly coupled to the coil tap for the first phase of the three phase brushless DC motor through the selection circuit.

10. The circuit of claim 1, further comprising a motor drive circuit coupled to the coil taps for the first, second and third phases of the three phase brushless DC motor and configured to drive said first, second and third phases.

11. The circuit of claim 10, wherein said control circuit is coupled to receive a signal from said motor drive circuit indicative of operating phase of the three phase brushless DC motor.

12. A circuit, comprising:
    a differential circuit having a first input coupled to a coil tap for a first phase of a three phase brushless DC motor and an output configured to generate a back EMF signal;
    a first divider circuit coupled between coil taps for a second phase and a third phase of said three phase brushless DC motor to define a two phase virtual center tap;
    said differential circuit further having a second input coupled to said two phase virtual center tap;
    a first selector circuit having a first input coupled to the coil tap for the first phase of the three phase brushless DC motor, a second input coupled to the coil tap for the second phase of the three phase brushless DC motor and an output coupled to the first input of the differential circuit;
    a second divider circuit coupled between coil taps for the first phase and the third phase of said three phase brushless DC motor to define a second two phase virtual center tap; and
    a second selector circuit having a having a first input coupled to the two phase virtual center tap, a second input coupled to the second two phase virtual center tap, and an output coupled to the second input of the differential circuit.

13. The circuit of claim 12, further comprising a control circuit configured control operation of the first selection circuit to selectively couple the first input of the differential circuit to either the coil tap for the first phase of the three phase brushless DC motor or the coil tap for the first phase of the three phase brushless DC motor depending on which phase is an electrically floating coil.

14. The circuit of claim 13, wherein the control circuit is further configured to control operation of the second selection circuit to selectively couple the second input of the differential circuit to either the two phase virtual center tap or the second two phase virtual center tap depending on which phase is an electrically floating coil.

15. A method, comprising:
    first sensing a voltage at a coil tap for a first phase of a three phase brushless DC motor, said first sensing being performed when said first phase is electrically floating;
    second sensing a two phase virtual center tap voltage between a second phase and a third phase of said three phase brushless DC motor, said second sensing being performed when said second and third phases are electrically driving; and
    performing a comparison of said voltage to said two phase virtual center tap voltage using a differential sensing circuit to generate a back EMF signal; and
    wherein performing the comparison comprises selectively connecting the voltage at the coil tap for the first phase to an input of the differential sensing circuit performing the comparison only when said first phase is electrically floating.

16. The method of claim 15, wherein the back EMF signal is representative of a back EMF voltage induced in the electrically floating first phase of the three phase brushless DC motor.

17. The method of claim 15, wherein performing comprises comparing.

18. The method of claim 15, wherein performing comprises differencing.

19. The method of claim 15, further comprising selectively connecting the two phase virtual center tap voltage between a second phase and a third phase for performing the second sensing in response to said first phase being electrically floating.

20. The method of claim 15, further comprising electrically isolating a coil tap for the first phase of said brushless DC motor from a node producing said two phase virtual center tap voltage.

* * * * *